United States Patent [19]
Lee et al.

[11] Patent Number: 5,853,069
[45] Date of Patent: Dec. 29, 1998

[54] MECHANISM FOR MICROADJUSTING BICYCLE BRAKE TENSION

[75] Inventors: Mike Lee; Thomas Lone, both of Chang Hua Hsien, Taiwan

[73] Assignee: Falcon Industrial Co., Ltd., Taichung Hsien, Taiwan

[21] Appl. No.: 825,316

[22] Filed: Apr. 1, 1997

[51] Int. Cl.[6] .................................................. B32G 1/06
[52] U.S. Cl. ........................................................ 188/24.19
[58] Field of Search ............................ 188/24.21, 24.19, 188/24.12, 24.22, 24.11

[56] References Cited

U.S. PATENT DOCUMENTS

| 4,838,386 | 6/1989 | Yoshigai | 188/24.12 |
|---|---|---|---|
| 4,838,387 | 6/1989 | Yoshigai | 188/24.21 |
| 5,058,450 | 10/1991 | Yoshigai | 74/502.2 |
| 5,152,377 | 10/1992 | Yoshigai | 188/24.11 |

*Primary Examiner*—Robert J. Oberleitner
*Assistant Examiner*—Melanie Torres
*Attorney, Agent, or Firm*—Browdy and Neimark

[57] ABSTRACT

An adjusting mechanism of the bicycle brake system is composed of a fastening member, a resilient member and an adjusting member. The fastening member is fastened with one of two brake arms of the bicycle brake system and with the bicycle frame. The resilient member has a deformable arcuate section and is fastened at one end thereof with the brake arm. The adjusting member is composed of an adjustment shaft and a tapered block which is movably fastened with the adjustment shaft such that the tapered block can be actuated to move linearly by the adjustment shaft so as to force the arcuate section of the resilient member to deform.

7 Claims, 4 Drawing Sheets

MECHANISM FOR MICROADJUSTING BICYCLE BRAKE TENSION

FIELD OF THE INVENTION

The present invention relates generally to a bicycle brake, and more particularly to a mechanism for microadjusting the tension of the bicycle brake.

BACKGROUND OF THE INVENTION

The conventional bicycle brake has shoes which are actuated by a brake cable to press against the wheel rim so as to reduce the speed of the bicycle wheel in motion. When the brake lever is acted on to pull the brake cable, the pull force overcomes the tension of a coil spring of the brake arm which is fastened pivotally with the bicycle frame. As a result, the brake arms are caused to turn to enable the brake shoes to press against the wheel rim. As the brake lever is relieved of the pressure exerting thereon, the brake arms are forced by the coil spring to return to their original positions, thereby resulting in the disengagement of the brake shoes with the wheel rim.

After a prolonged use of the bicycle brake, the tension of the coil springs of the brake arms must be adjusted so as to ensure that the gaps between the wheel rim and the brake arms are equal in width to each other. The job of adjusting the tension of the conventional bicycle brake is a cumbersome task in view of the structural complexity of the coil springs of the conventional bicycle brake.

SUMMARY OF THE INVENTION

The primary objective of the present invention is to provide a bicycle brake with a simple mechanism for microadjusting the tension of the bicycle brake with ease and speed.

In keeping with the principle of the present invention, the foregoing objective of the present invention is attained by a mechanism, which is composed of a fastening member, a resilient member, and an adjusting member. The bottom ends of the brake arms of the bicycle braking system are fastened pivotally with the fastening member which is in turn fastened with the front fork or the rear fork of a bicycle frame. The resilient member is fastened at one end thereof with the fastening member, and at another end thereof with the brake arms. The adjusting member is composed of an adjustment shaft and a tapered block which is located on an arcuate section of the resilient member and is capable of moving linearly along with the adjustment shaft so as to bring about a curve deformation of the arcuate section of the resilient member.

The foregoing objective, features, functions, and advantages of the present invention will be more readily understood upon a thoughtful deliberation of the following detailed description of an embodiment of the present invention in conjunction with the accompanying drawings.

DETAILED DESCRIPTION OF THE INVENTION

Figure 1:
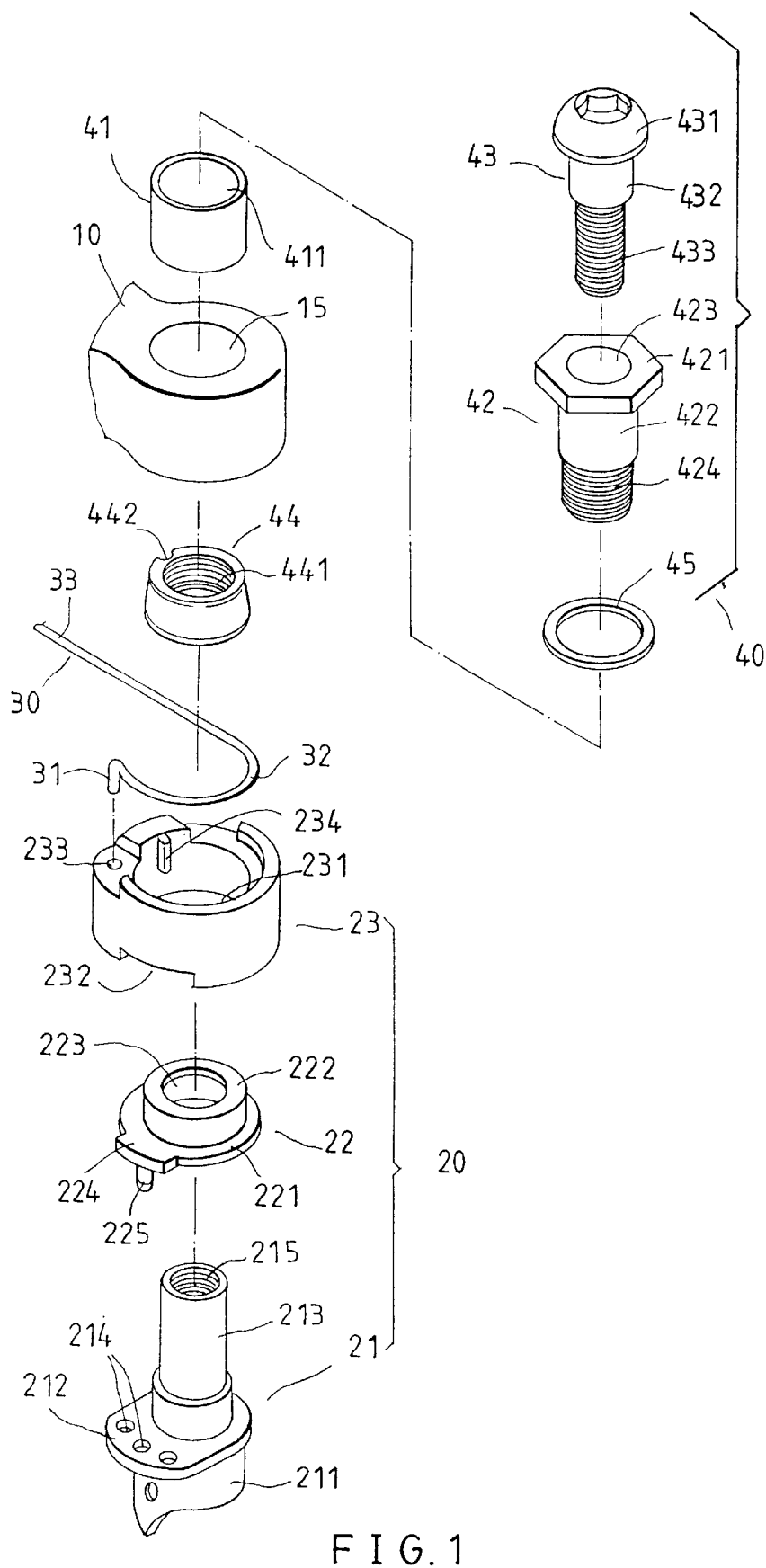
FIG. 1 shows an exploded view of the present invention.

As shown in all drawings provided herewith, a bicycle brake system is composed of two brake arms symmetrical to each other and having a brake arm body 10, a fastening member 20, a resilient member 30, and an adjusting member 40.

The brake arm body 10 is provided at the center thereof with a brake shoe 11, at the top end thereof with a first projection 12 and a second projection 13, and at the bottom end thereof with a trapezoidal hole 14 and a through hole 15.

The fastening member 20 is composed of a fastening seat 21, a locating seat 22, and a base 23, which are connected in series. The fastening seat 21 is provided with an arcuate portion 211, a disk portion 212 and a shaft portion 213. The arcuate portion 211 is fastened with a fork of the bicycle frame. The disk portion 212 is provided with three pin holes 214 parallel to one another. The shaft portion 213 has a predetermined length and a threaded hole 215. The locating seat 22 of a trapezoidal construction is provided with a large end portion 221, a small end portion 222, and a round through hole 223. The large end portion 221 has a stop piece 224 extending therefrom such that the stop piece 224 is flush with the large end portion 221. The stop piece 224 is provided with a locating pin 225 fastened therewith such that the locating pin 225 is perpendicular to the stop piece 224, and that the locating pin 225 is engageable with any one of the three pin holes 214 of the disk portion 212. The base 23 has a through hole 231 in which the locating seat 22 is received. The base 23 is provided with a depression 232 located in the edge of one end thereof. The depression 232 serves the purpose of allowing the locating seat 22 to turn in relation to the base 23. The base 23 is further provided in the edge of another end thereof with a fitting hole 233. The through hole 231 of the base 23 is provided therein with a position restricting column 234.

The resilient member 30 is an elongated bar spring having a hooked end 31 engageable with the fitting hole 233 of the base 23. The resilient member 30 has an arcuate section 32 extending from the hooked end 31, and an extension portion 33 extending from the arcuate section 32. The arcuate section 32 is capable of deformation and is received in the through hole 231 of the base while the extension portion 33 urges the second projection 13 of the brake arm body 10.

The adjusting member 40 is composed of a bushing 41, an adjustment shaft 42, a locating shaft 43, a tapered block 44 and a washer 45. The bushing 41 has an axial hole 411 and is inserted into the through hole 15 of the brake arm body 10 for reducing the mechanical friction between the adjusting member 40 and the brake arm body 10. The adjustment shaft 42 has a hexagonal head 421 to facilitate the manipulating of the adjustment shaft 42 by a wrench. The adjustment shaft 42 has a threaded end 424 opposite to the hexagonal head 421, and a smooth body 422 located between the head 421 and the threaded end 424. The smooth body 422 is rotatably mounted in the axial hole 411 of the bushing 41 such that the smooth body 422 is circumvented by the arcuate section 32 of the resilient member 30. The adjustment shaft 42 has an axial hole 423 engageable with the shaft portion 213 of the fastening seat 21. The threaded end 424 is located at the arcuate section 32 of the resilient member 30. The locating shaft 43 has a stopping block 431 greater in diameter than the axial hole 423 of the adjustment shaft 42 such that the stopping block 431 is stopped by the hexagonal head 421 of the adjustment shaft 42 when the adjustment shaft 42 is joined with the locating shaft 43. The locating shaft 43 has a threaded portion 433 opposite to the stopping block 431, and a body portion 432 located between the stopping block 431 and the threaded portion 433. The body portion 432 is greater in diameter than the threaded portion 433 and is fitted into the axial hole 423 of the adjustment shaft 42. The threaded end 433 is engageable with the threaded hole 215 of the fastening seat 21 such that the shaft portion 213 of the fastening seat 21 is urged by the body 432 of the locating shaft 43. As a result, the adjustment shaft 42 is securely fitted between the trapezoidal hole of the brake arm body 10 and the through hole 231 of the base 23. The tapered block 44 has a tapered end 441 provided with a slot 442 engageable with the position restricting column 234 of the base 23. The tapered block 44 has a threaded axial hole 443 engageable with the threaded end 424 of the adjustment shaft 42.

Figure 2:
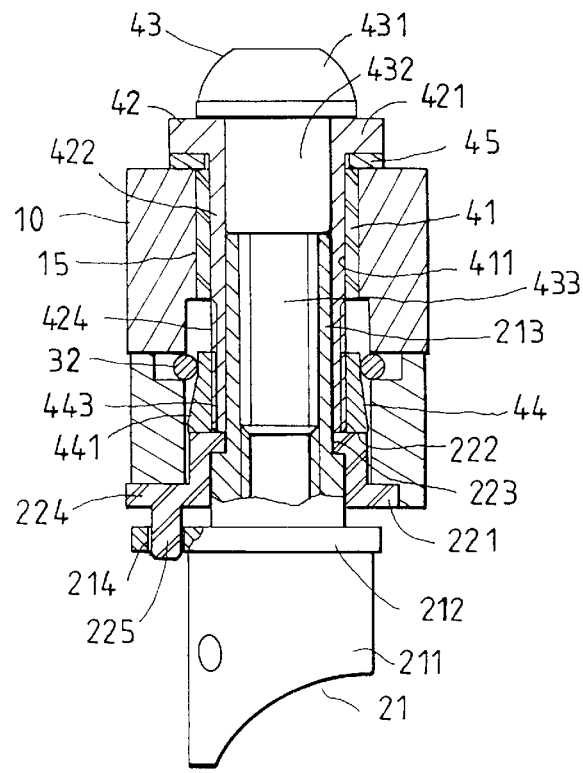
FIG. 2 shows a partial sectional view of the present invention in combination.
Figure 3:
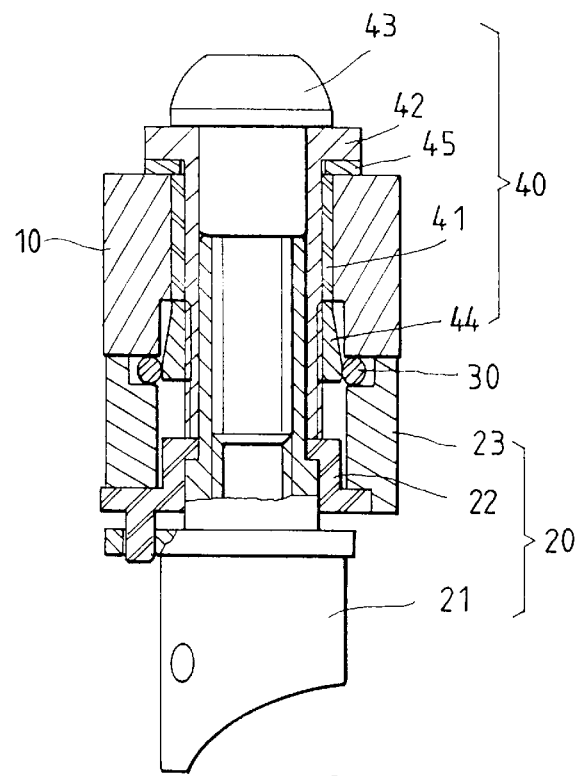
FIG. 3 shows a schematic view of the post-adjustment of the present invention.
Figures 4, 5:
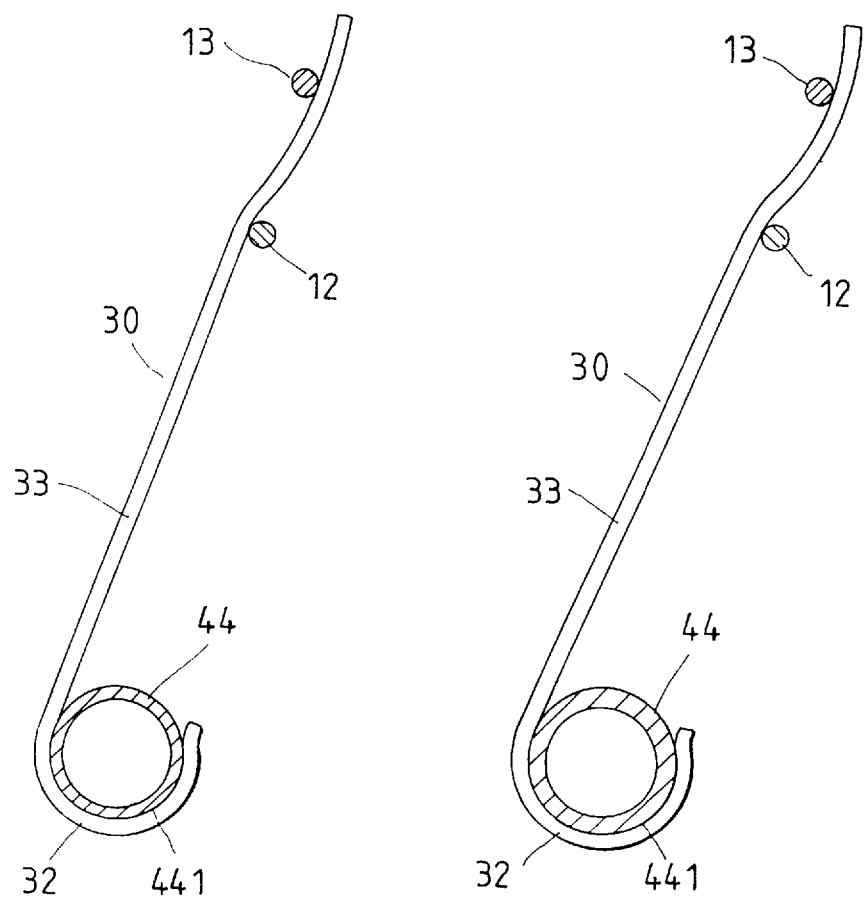
FIG. 4 is a schematic view illustrating the working relationship between the resilient member and the tapered block of the present invention.
FIG. 5 is another schematic view illustrating the working relationship between the resilient member and the tapered block of the present invention.
Figure 6:
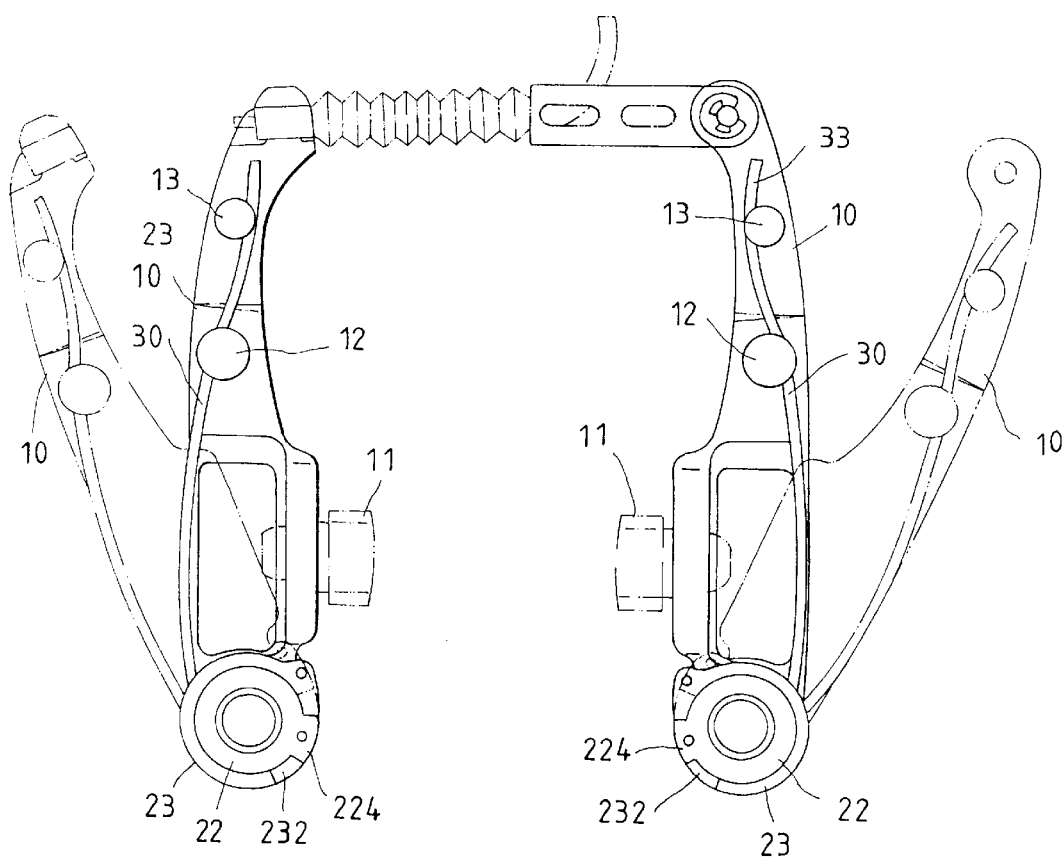
FIG. 6 shows a schematic view of the present invention which is mounted on a bicycle frame.

In combination, the tapered end 441 of the tapered block 44 is contiguous to the arcuate section 32 of the resilient member 30, as shown in FIGS. 2 and 4. As the hexagonal head 421 of the adjustment shaft 42 is rotated with a wrench, the tapered block 44 is caused to move linearly in view of the fact that the slot 442 of the tapered block 44 is engaged with the position restricting column or protuberance 234 of the base 23. As a result, the arcuate section 32 of the resilient member 30 is deformed by the tapered end 441 of the tapered block 44 such that the tension of the resilient member 30 against the brake arm body 10 becomes greater in a progressive manner, as illustrated in FIGS. 3 and 5.

The base 23 can be slightly rotated in relation to the locating seat 22, thanks to the depression 232 which is corresponding in location to the stop piece 224 of the locating seat 22. As a result, the base 23 is allowed to swivel slightly along with the brake arm body 10 at the time when the brake cable is severed accidentally, thereby preventing the brake arm from being caught by the spokes of the wheel in motion.

The embodiment of the present invention described above is to be regarded in all respects as being merely illustrative and not restrictive. Accordingly, the present invention may be embodied in other specific forms without deviating from the spirit thereof. For example, the linear displacement of the tapered block 44 of the present invention may be attained by a linear motion of the adjustment shaft 42, instead of the rotational motion of the adjustment shaft 42. The present invention is therefore to be limited only by the scopes of the following appended claims.

What is claimed is:

1. A mechanism for adjusting tension of two brake arms of a bicycle brake system, said mechanism comprising:

a fastening member adapted to be fastened pivotally at one end thereof with one of two brake arms of the bicycle brake such that said fastening member is adapted to be fastened at another end thereof with a bicycle frame;

a resilient member having a deformable arcuate section and fastened at one end thereof with said fastening member and at another end thereof with the brake arm; and an adjusting member composed of an adjustment shaft and a tapered block movably fastened with said adjustment shaft such that said tapered block can be actuated by said adjustment shaft to move linearly so as to force said arcuate section of said resilient member to deform.

2. The mechanism as defined in claim 1, wherein said tapered block is actuated to move linearly by rotating said adjustment shaft.

3. The mechanism as defined in claim 1, wherein said fastening member comprises a fastening seat, a locating seat and a base, said fastening seat being fastened with the bicycle frame such that a brake shoe of the brake arm is contiguous to the rim of a bicycle wheel, said base being provided with a through hole extending in the direction of a longitudinal axis of said base, said through hole being provided therein with a protuberance; wherein said adjusting member is further composed of a locating shaft which is fastened with said fastening seat for locating said fastening seat; and wherein said tapered block is provided with a retaining slot engaged with said protuberance of said through hole of said base so as to enable said tapered block to move linearly when said adjustment shaft is rotated.

4. The mechanism as defined in claim 1, wherein said adjustment shaft is provided with a means for protecting said adjustment shaft from mechanical friction.

5. The mechanism as defined in claim 3, wherein said base is provided with a depression located on one side thereof facing said locating seat; wherein said locating seat is provided with a stop piece which is smaller in dimension than said depression of said base and is located on one side thereof facing said base; and wherein said base is joined with said locating seat such that said stop piece is received in said depression to permit said base and said locating seat to rotate limitedly in relation to each other.

6. The mechanism as defined in claim 1, wherein said resilient member is an elongated bar spring.

7. The mechanism as defined in claim 1, wherein said tapered block is actuated to move linearly by a linear motion of said adjustment shaft.

\* \* \* \* \*